(No Model.)
J. G. BAKER.
MEAT CUTTING MACHINE.
No. 339,833. Patented Apr. 13, 1886.
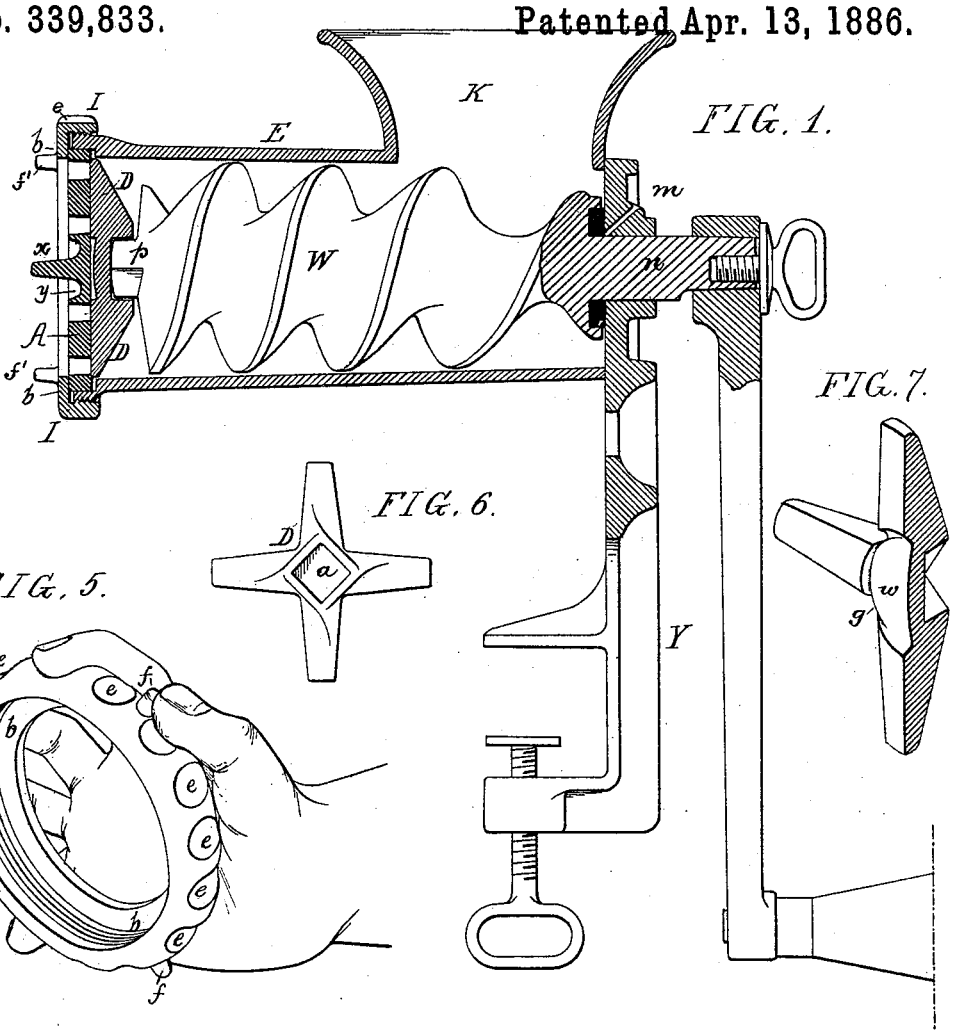
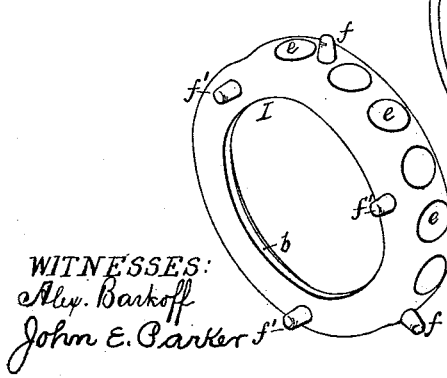
WITNESSES:
Alex. Barkoff
John E. Parker
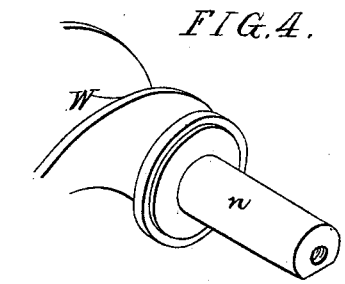
INVENTOR:
John Gulick Baker
by his Attorneys:
Howson & Sons
N. PETERS, Photo-Lithographer, Washington, D. C.

UNITED STATES PATENT OFFICE.

JOHN G. BAKER, OF PHILADELPHIA, PENNSYLVANIA, ASSIGNOR TO THE ENTERPRISE MANUFACTURING COMPANY, OF SAME PLACE.

MEAT-CUTTING MACHINE.

SPECIFICATION forming part of Letters Patent No. 339,833, dated April 13, 1886.

Application filed December 15, 1884. Serial No. 150,375. (No model.) Patented in Canada December 31, 1884, No. 20,826.

*To all whom it may concern:*

Be it known that I, JOHN G. BAKER, a citizen of the United States, and a resident of Philadelphia, Pennsylvania, have invented certain Improvements in Meat-Cutting Machines, of which the following is a specification.

My invention consists of certain improvements, fully described and claimed hereinafter, in the construction of the machine for cutting up plastic or yielding substances, for which Letters Patent No. 271,398 were granted to my assignees, the Enterprise Manufacturing Company, of Pennsylvania, January 30, 1883.

In the accompanying drawings, Figure 1 is a side view, mainly in section, of the machine with my improvements; Figs. 2, 3, 4, and 5, perspective views of detached parts of the machine; Fig. 6, a rear view of the knife, and Fig. 7 a sectional perspective view showing the face of the knife.

Referring in the first instance to Fig. 1, E is the outer shell or casing of the machine, with the interior of which communicates the hopper K, the inner end of the casing being secured to and closed by a plate, $m$, in which is the bearing for the journal $n$ of the forcing-screw W, the said plate $m$ forming, by preference, part of a stand, Y, which carries the entire machine, and which may be constructed for being clamped or otherwise secured to a table, for the machine shown in the drawings is designed to mince or cut up meat, and is intended for family use or for store-keepers. The forcing-screw W terminates at its outer end in a square or many-sided projection, $p$, which fits loosely in a recess in the knife D, the latter having in the present instance four radial blades, as shown in Fig. 6. A perforated plate or disk, A, fits into an annular recess in the outer end of the casing E, and is confined thereto by the flange $b$ of an internally-threaded ring, I, which is screwed onto the threaded outer end of the casing, the said perforated plate A being prevented from turning by a pin, $v$. (Shown in Fig. 2.) Lumps of meat are placed in the hopper K, and will be forced by the screw, if turned in the proper direction, through the interior of the casing, and every hole in the plate will receive a projecting portion of the meat, the projections being rapidly cut off, and as rapidly succeeded by other projections, so that the meat will be cut into fragments.

The above description of the machine and the mode of operation will apply to that described in aforesaid patent, the present application relating to the detailed construction of some of the parts referred to. The internally-threaded ring I performs the same functions as that described in the patent, but is differently constructed, with the view of more easily manipulating it. I slightly round the periphery of the ring, and make in it depressions $e$, and in addition to this cast on it projections $f\ f'$, the depressions affording lodgments for the fingers and thumb of the operator, and one or more of the projections affording an opportunity for the exercise of force in turning the ring, as clearly shown in Fig. 5. The projections $f'$, on the face of the ring, also serve as bearings for a rod or bar, which may be used as a lever to turn the ring when the grasp of the hand is not sufficient.

In the machine shown in the patent no facilities were afforded for detaching the perforated plate from the casing after the withdrawal of the ring; but in the present machine a central projection, $x$, is cast on the plate. By seizing this projection between the finger and thumb the plate can be easily shaken loose and detached from the recess in the casing, thereby dispensing with the use of an instrument heretofore required to pry the plate from the said recess. In order to prevent such a preponderance of metal at the center of the plate as would tend to cause uneven expansion and contraction, I form around the projection $x$ a groove, $y$, as shown in Figs. 1 and 2.

In the machine shown in the patent a square opening extended through the knife D, and a collar on the screw bore against the central projection at the rear of the knife; but in the present machine there is a recess in the knife, and the end of the square projection of the screw bears against the bottom of this recess, the said projection fitting loosely therein—an arrangement which results in economy in making this part of the machine and permits the knife to easily accommodate itself to the face of the perforated plate.

On the face of the knife is a central recess, $w$, in order to provide for the reduction of the knives by grinding or wear. If the bottom of this recess is flat the meat and sinews have a tendency to accumulate in the recess and form a hard bony mass, which eventually interferes with the proper operation of the machine. In order to overcome this difficulty I make the bottom of the recess convex, as shown in Fig. 7, the recess being of such extent as to leave openings $g$ between the blades. Practice has shown that by this construction of the knife the above evil is effectually avoided.

I claim as my invention—

1. The combination of the casing E and ring I with the perforated plate having a central projection, $x$, substantially as specified.

2. The perforated plate having central projection and surrounding groove $y$, as set forth.

3. The combination of the casing E, the perforated plate A, and the knife D, having a recess at the back, with the screw W, having a projection, $p$, fitting loosely in the said recess, and bearing against the bottom of the same, substantially as described.

4. The combination of the casing and perforated plate with the knife D, having in its face a central recess, $w$, with convex bottom and openings $g$, as set forth.

In testimony whereof I have signed my name to this specification in the presence of two subscribing witnesses.

JOHN G. BAKER.

Witnesses:
HENRY BOSSERT,
HARRY SMITH.